United States Patent [19]

Slaugh et al.

[11] 4,395,356

[45] Jul. 26, 1983

[54] METHOD FOR REMOVING CATALYST RESIDUES FROM SOLUTIONS OF POLY-1-BUTENE

[75] Inventors: Lynn H. Slaugh; Carl L. Willis, both of Houston, Tex.

[73] Assignee: Shell Oil Company, Houston, Tex.

[21] Appl. No.: 333,492

[22] Filed: Dec. 22, 1981

Related U.S. Application Data

[63] Continuation of Ser. No. 210,907, Nov. 28, 1980, abandoned.

[51] Int. Cl.³ .................... B01D 15/06; B01J 37/00
[52] U.S. Cl. .................... 252/413; 423/82; 423/112; 423/181; 423/206 R; 423/527; 526/903; 526/348.6; 526/912; 585/523; 585/524
[58] Field of Search .............. 252/413, 414; 585/524, 585/523; 526/348.6, 912, 903; 423/82, 112, 181, 206, 527

[56] References Cited

U.S. PATENT DOCUMENTS

| | | | |
|---|---|---|---|
| 3,068,306 | 12/1962 | Hay et al. | 585/524 |
| 3,117,936 | 1/1964 | Michalko | 252/413 |
| 3,248,278 | 4/1966 | Wilson | 423/519 X |
| 3,361,727 | 1/1968 | Lutz | 585/524 |
| 3,935,098 | 1/1976 | Oda et al. | 423/DIG. 14 |
| 3,976,759 | 8/1976 | Bennett et al. | 252/413 X |
| 4,113,842 | 9/1978 | McCullough et al. | 423/308 |
| 4,151,076 | 4/1979 | Reinhardt | 423/DIG. 14 |
| 4,163,709 | 8/1979 | Burk et al. | 252/413 X |
| 4,188,308 | 2/1980 | Vaughan | 252/413 |
| 4,243,550 | 1/1981 | Burk et al. | 252/413 X |
| 4,293,403 | 10/1981 | Burk et al. | 252/413 X |

FOREIGN PATENT DOCUMENTS

899288  6/1962  United Kingdom ....... 423/DIG. 14

*Primary Examiner*—Helen M. S. Sneed

[57] ABSTRACT

A process for removing catalyst residues from poly-1-butene which is disclosed which comprises contacting an organic phase containing the poly-1-butene dissolved in an inert hydrocarbon solvent with an aqueous solution of an alpha-hydroxysulfonic acid and then separating the poly-1-butene-containing phase from the aqueous phase.

6 Claims, No Drawings

METHOD FOR REMOVING CATALYST RESIDUES FROM SOLUTIONS OF POLY-1-BUTENE

This is a continuation of application Ser. No. 210,907, filed Nov. 28, 1980, now abandoned.

FIELD OF THE INVENTION

This invention relates to a process for removing catalyst residues from solutions of poly-1-butylene.

BACKGROUND OF THE INVENTION

Poly-1-butenes are becoming ever more important in the commercial world. The commercially useful poly-1-butene is typically a highly isotactic material with a relatively high degree of crystallinity. Generally, poly-1-butene is produced from 1-butene in the absence of a diluent and a Ziegler-type catalyst. Diluents can be any of the many inert hydrocarbons such as n-hexane, heptane, gasoline, the monomer itself, a mixture of butene-1 and butene-2, as well as the chlorinated hydrocarbons. The reaction is typically carried out in the liquid phase with the poly-1-butene being dissolved therein. Upon completion of the polymerization reaction, the catalyst is typically deactivated and removed by any of the techniques and manipulations well known in the art such as by treating with an alcohol, an alcoholic solution of a mineral acid, dilute aqueous acid solutions or simply with the oxygenated water. The poly-1-butenes are relatively susceptible to oxidation and for that reason a catalyst removal process must be selected which avoids deleterious oxidation of the polymer. While dilute aqueous solutions of sulfuric acid are quite effective for dissolving and removing catalyst residues, these materials have a tendency to degrade the polymer. The alpha-hydroxysulfonic acids of the instant invention are excellent chelating agents and readily removed catalyst residues from solutions of poly-1-butene, and yet they do not degrade the polymer as would solutions of sulfuric acid.

Alpha-hydroxysulfonic acids have been disclosed in the literature (see for example U.S. Pat. Nos. 3,248,278 issued Apr. 26, 1966 and 4,113,842 issued Sept. 12, 1978) for use in the removal of metal ions from aqueous metal streams. The process of the instant invention uses alpha-hydroxysulfonic acids for the removal of ionic residues from non-aqueous systems.

SUMMARY OF THE INVENTION

The present invention provides a method for removing catalyst residues such as $Ti^{4+}$, $Al^{3+}$, $Mg^{++}$, $Na^+$ and $Cl^-$ from a solution of poly-1-butene by contacting the poly-1-butene solution with an aqueous solution of an alpha-hydroxysulfonic acid. After contact the aqueous and non-aqueous phases are separated, leaving the purified poly-1-butene in the non-aqueous phase. The alpha-hydroxysulfonic acid is readily prepared by reacting a carbonyl compound, sulfur dioxide and water. After extraction the carbonyl compound is readily recovered from the resultant sulfonate by the application of heat. Residual alpha-hydroxysulfonic acid remaining in the polymer phase can readily be decomposed by the application of heat and/or vacuum, thereby driving off the sulfur dioxide. The use of an aqueous solution of alpha-hydroxysulfonic acid is far superior to the use of aqueous solutions of sulfuric acid since the former does not degrade the polymer as does the latter.

DESCRIPTION OF THE PREFERRED EMBODIMENTS

In general, the poly-1-butene to be purified of catalyst residues is found contained in a diluent or solvent. These solvents are well known in the art and typically are inert hydrocarbon solvents such as n-hexane, heptane, gasoline, the monomer itself, butene, or a mixture of 1-butene and 2-butene, as well as chlorinated hydrocarbon solvents. These solvents are utilized to maintain the poly-1-butene in solution in the polymerization step. Typical examples of commercial solvents utilized in commercial operations can be found for example in the reference "Butylene Polymers", Stanford Research Institute, Menlo Park, Calif., Report No. 74.

The catalyst residues to be removed in the instant invention result from the use of Ziegler-type catalysts which are well known in the art. Typically, they are complexes of compounds of metals of Groups I–III in the periodic table with derivatives of transition metals of Groups IV–VIII. The most commonly used group I–III metal is aluminum (e.g., in the form of aluminum trialkyls and various aluminum alkyl halides). Other Group I–III metal compounds may be present. Halide atoms are involved in almost (but not quite) all such catalyst systems. The transition metal compound is most frequently a titanium halide, usually a chloride, although other compounds such as vanadium chloride, zirconium chloride and chromium acetyl acetonate are used. Group I and Group II salts are sometimes utilized in combination with the transition metal halide.

The alpha-hydroxysulfonic acids used in the extraction process of the instant invention are prepared by reacting a carbonyl compound with sulfur dioxide and water according to the following general equation:

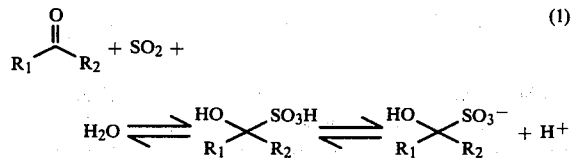

where $R_1$ and $R_2$ are hydrogen or hydrocarbyl with up to about 7 carbon atoms. Preferably the hydrocarbyl is unsubstituted or substituted alkyl with up to about 7 carbon atoms.

Illustrative examples of carbonyl compounds useful to prepare the alpha-hydroxysulfonic acids used in this invention are found where $R_1 = R_2 = H$(formaldehyde)
$R_1 = H$, $R_2 = CH_3$(acetaldehyde)
$R_1 = H$, $R_2 = CH(CH_3)_2$(i-butyraldehyde)
$R_1 = H$, $R_2 = \underline{CCHCHCHO}$(furfural)
$R_1 = H$, $R_2 = \underline{C(CH)_4C(OH)}$(salicylaldehyde)
$R_1H$, $R_2 = \underline{C(CH)_4CH}$(benzaldehyde)
$R_1 = R_2 = CH_3$(acetone)
$R_1 = CH_3$, $R_2 = CH_2CH_3$(methyl ethyl ketone)
$R_1 = CH_3$, $R_2 = CHC(CH_3)_2$(mesityl oxide)
$R_1 = CH_3$, $R_2 = CH_2CH(CH_3)_2$(methyl i-butyl ketone)
$R_1$, $R_2 = (CH_2)_5$(cyclohexanone) or
$R_1 = CH_3$, $R_2 = CH_2Cl$(chloroacetone)

A unique feature of these acids is the reversibility of the acid formation (eq. 1). That is, when heated, sulfur dioxide is liberated and the solution becomes neutral. Decreasing the sulfur dioxide pressure for the system induces the same effect. This reversibility provides a good method for removing unutilized acid, i.e., by increasing the temperature or lowering the pressure, the sulfur dioxide can be driven off, leaving the carbonyl compound and water which can be removed by conventional means, such as distillation. Thus, by the application of heat and/or vacuum under appropriate conditions as determined by the individual alpha-hydroxysulfonic acid, the alpha-hydroxysulfonic acid can be decomposed into its components, freeing the sulfur dioxide.

Metal ions are thought to chelate with the alpha-hydroxysulfonic acid according to the following formula.

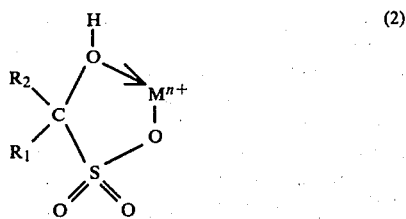

(2)

Where $M^{n+}$ is for example $Ti^{4+}$, $Al^{3+}$, $Na^+$, etc. The spent aqueous extractant will contain the sulfonate of formula (2) and if desired the carbonyl compound can be recovered for recycle by the application of heat according to the following formula.

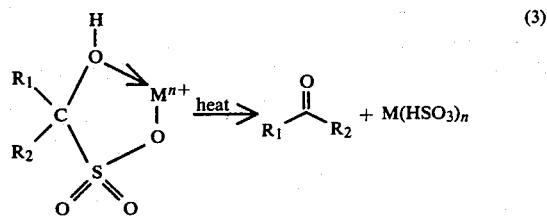

(3)

The alpha-hydroxysulfonic acid is prepared according to equation 1, using an excess of water over the stoichiometric amount in order to provide an aqueous solution. The aqueous solution of alpha-hydroxysulfonic acid is contacted with the hydrocarbon solution of poly-1-butene and after suitable mixing and contact time the aqueous phase is separated from the organic phase. Additional water and/or hydrocarbon may be added prior to separation to facilitate separation. Methods of contacting and separation of different phases are routine and well known in the art. After separation, the poly-1-butene in the organic phase can further be concentrated by removing the hydrocarbon solvent. The temperature at which the extraction takes place will depend upon the particular alpha-hydroxysulfonic acid being utilized. Since equation (1) is a temperature dependent equilibrium reaction, the extraction must be carried out at a temperature low enough to allow formation of sufficient alpha-hydroxysulfonic acid. The lower carbonyl compounds can be used at higher temperatures. For example, alpha-hydroxymethanesulfonic acid can be used at temperatures up to about 100° C. (at one atmosphere); alpha-hydroxyethanesulfonic acid at temperatures up to about 60° C. (at one atmosphere), etc. The temperature-equilibrium concentration of the alpha-hydroxysulfonic acid can readily be determined by routine experimentation.

The invention will be illustrated by reference to the following Illustrative Embodiments which are provided for illustration and are not to be construed as limiting the invention.

ILLUSTRATIVE EMBODIMENTS

In a typical preparation of an alpha-hydroxysulfonic acid, in particular alpha-hydroxymethanesulfonic acid, about 30 grams of sulfur dioxide were condensed (dry ice/acetone bath) into a 200 cc Fisher-Porter pressure bottle. The reaction vessel was opened and slightly less than one equivalent of aqueous formaldehyde solution (37%w $H_2CO$) was added. The pressure bottle was sealed and the mixture warmed to room temperature. The mixture was stirred vigorously overnight and then vented ($SO_2$) to the atmosphere. Analysis of the resulting aqueous phase (potentiometric titration with $NaOH/H_2O$) typically found about 5 M alpha-hydroxymethanesulfonic acid and a trace of sulfur dioxide. The solution could be stored for up to about four weeks in the pressure bottle without loss in activity.

EXAMPLE 1

A solution of 3.0 g of isotactic poly-1-butene dissolved in 30 g of heptane was contacted with 15 g (75 mmol) of an aqueous solution of alpha-hydroxymethanesulfonic acid prepared as described above. The contact temperature was about 45° C. The mixture was agitated for 30 minutes. After separation the organic phase was concentrated by removing the heptane, affording a white polybutylene product which was analyzed. The results are shown in Table 1.

EXAMPLE 2

This experiment was performed in the manner similar to that of Example 1 above except that 15 g (54 mmol) of an aqueous solution of sulfuric acid ($H_2SO_4$) was utilized. The reaction temperature was about 45° C. The mixture was also agitated for 30 minutes. After separation the organic phase was concentrated by removing the heptane, affording an off-colored, brownish, polybutylene product which was analyzed. The results are shown in Table 1.

EXAMPLE 3

An aliquot of poly-1-butene containing Mg ions (from $MgCl_2$) in addition to the other catalyst residue ions was extracted according to the procedure outlined in Example 1 above. A solution of 3.0 g of this isotactic poly-1-butene dissolved in 30 g of heptane was contacted with 15 g (75 mmol) of an aqueous solution of alpha-hydroxymethanesulfonic acid. The contact temperature was 45° C. and the mixture was agitated for about 30 minutes. After separation the organic phase was concentrated by removing the heptane, affording a white polybutylene product which was analyzed. The results are shown in Table 1.

EXAMPLE 4

This experiment was also performed similar to Example 3 above except that 15 g (54 mmol) of an aqueous solution of sulfuric acid ($H_2SO_4$) was utilized. The reaction temperature was 45° C. and the mixture was agitated for about 30 minutes. After separation the organic phase was concentrated by removing the heptane, affording an off-colored, brownish, polybutylene product which was analyzed. The results are shown in Table 1.

As can be seen from the examples above, the use of aqueous solutions of alpha-hydroxysulfonic acid efficiently extracts catalyst residues and does not degrade the polymer as does the use of solutions of sulfuric acid.

TABLE 1

| | Catalyst Residues in Poly-1-Butene | | | | | | | | | | |
|---|---|---|---|---|---|---|---|---|---|---|---|
| | BEFORE (AFTER) DEASHING (PPM) | | | | | | % ASH REMOVED | | | | |
| | Ti | Mg | Al | Na | Cl | S | Ti | Mg | Al | Na | Cl |
| Example 1 | 162 | — | 132 | 18 | — | 800 | 69 | — | 32 | 67 | — |
| | (51) | — | (90) | (6) | — | (3,200) | | | | | |
| Example 2 | 162 | — | 132 | 18 | — | 800 | 51 | — | — | 83 | — |
| | (80) | — | — | (3) | — | (6,600) | | | | | |
| Example 3 | 36 | 20 | 190 | 8 | 200 | 300 | 53 | 80 | 71 | 63 | 50 |
| | (15) | (4) | (56) | (3) | (100) | (2,500) | | | | | |
| Example 4 | 32 | 20 | 190 | 8 | 200 | 300 | 53 | 80 | 69 | 0 | 0 |
| | (15) | (4) | (58) | (8) | (200) | (8,900) | | | | | |

We claim:

1. A process for removing catalyst residues from poly-1-butene which comprises contacting an organic phase containing poly-1-butene dissolved in an inert hydrocarbon solvent with an aqueous phase containing an alpha-hydroxysulfonic acid prepared by reacting a carbonyl compound of the general formula $R_1R_2CO$ wherein $R_1$ and $R_2$ are individually hydrogen or hydrocarbyl of up to about 7 carbon atoms with sulfur dioxide and water and subsequently separating the poly-1-butene-containing organic phase from the aqueous phase.

2. The process of claim 1 wherein the poly-1-butene is dissolved in an alkane having a carbon number ranging from about 4 to about 12.

3. The process of claim 2 wherein the alkane has a carbon number ranging from about 6 to about 10.

4. The process of claim 3 wherein the alkane is hexane, heptane or cyclohexane.

5. The process of claim 1 wherein the poly-1-butene is dissolved on 1-butene.

6. The process of claim 1 wherein the poly-1-butene-containing organic phase after separation is additionally subjected to heat and/or vacuum in order to decompose any residual alpha-hydroxymethanesulfonic acid, and thereby driving off the sulfur dioxide.

* * * * *